G. W. RANDOLPH.
COMBINED COTTON SCRAPER AND CULTIVATOR.
APPLICATION FILED AUG. 11, 1908.

904,447.

Patented Nov. 17, 1908.

Witnesses

Inventor
George W. Randolph
By Odom Bros.
Attorneys

UNITED STATES PATENT OFFICE.

GEORGE W. RANDOLPH, OF JACKSON, TENNESSEE.

COMBINED COTTON SCRAPER AND CULTIVATOR.

No. 904,447.  Specification of Letters Patent.  Patented Nov. 17, 1908.

Application filed August 11, 1908. Serial No. 448,068.

*To all whom it may concern:*

Be it known that I, GEORGE W. RANDOLPH, a citizen of the United States, residing at Jackson, in the county of Madison and State of Tennessee, have invented certain new and useful Improvements in a Combined Cotton Scraper and Cultivator; and I do hereby declare the following to be a full, clear, and exact description of the invention, such as will enable others skilled in the art to which it appertains to make and use the same.

My invention relates to farm implements and particularly to a combination device adapted for scraping or cutting out young cotton or corn plants and also adapted for cultivating the remaining plants or any other farm products which grow in rows.

The object of the invention is to simplify the construction of an adjustable cotton scraper and cultivator whereby it may be sold cheaply and give complete satisfaction in use.

Other objects will become apparent from the following description.

The invention consists of the features of construction and combinations of parts hereinafter described and specified in the claim.

Figure 1:
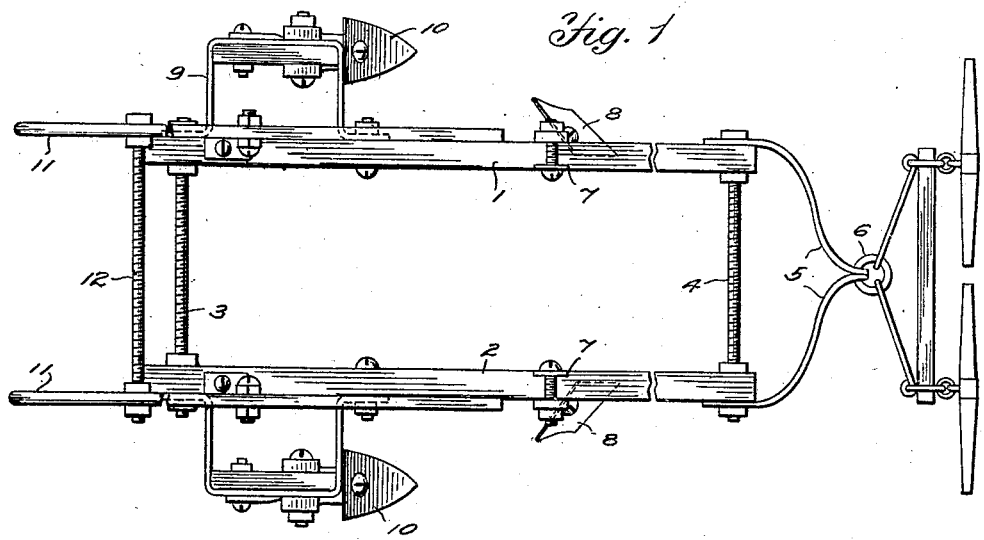
Figure 2:
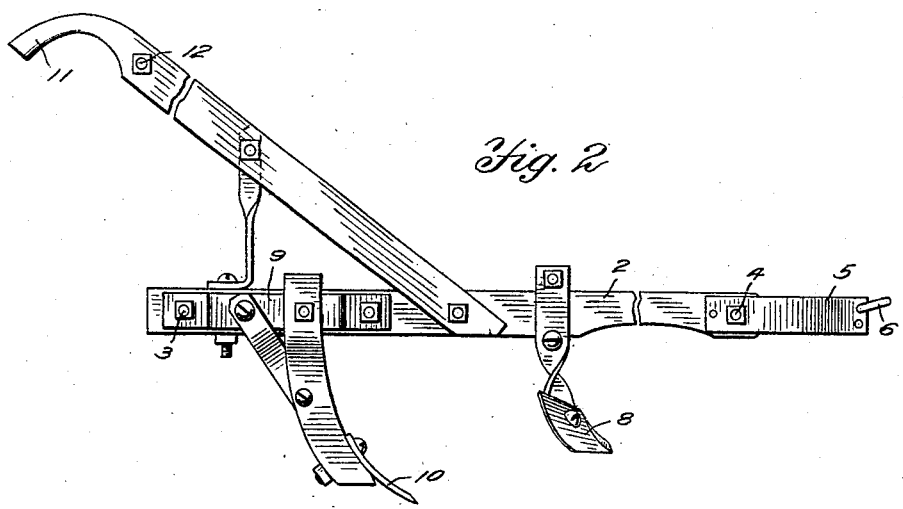

In the accompanying drawing, illustrating the preferred embodiment of my invention: Figure 1 is a plan view of my invention, and Fig. 2 is a side elevation thereof.

Referring more particularly to the drawing, the device is composed of two substantially parallel beams 1 and 2 which are adjustably connected near each end by screw threaded rods 3 and 4. The forward ends of said beams carry an adjustable clevis which consists of two bowed resilient strips 5, one end of each of which is secured to one of the beams by the front adjusting rods, while the other ends of said strips are fastened together and provided with a ring 6 for attachment of the whiffle tree. It is necessary that the strips 5 should be resilient in order that they may adjust themselves when the beams are adjusted because said strips are rigidly connected against turning laterally on said beams by the front adjusting rod.

Each beam is notched preferably, on its inner face, as at 7, and in said notch is mounted or secured a scraper 8, said scrapers being oppositely inclined. As shown, the scrapers are mounted on the beams about midway of their length but their positions may be changed if it is found necessary or desirable. Near the rear end of each beam there is secured an outwardly projecting bracket or frame 9 on which is mounted a plow 10. By the use of these brackets the plows are spread farther apart than the scrapers and are so arranged as to be in alinement with the outer edges of said scrapers. If the plows were arranged immediately behind the scrapers, they would cover up the plants instead of throwing the dirt up against the sides of the row as is intended.

The handles 11 are secured respectively to the beams and are, like said beams, connected by an adjustable rod 12 so that they may be adjusted to suit the space between said beams. It will be observed that the adjustment of the beams permits the farmer to cut out any desired amount of plants and leave a row of the requisite width. It will be understood, of course, that in use the device straddles the row and should be drawn by two horses each walking in the space between two of the rows. After a row has been trimmed up by the use of the scrapers and plows, as shown in the drawing, said scrapers may be removed and larger plows substituted for the shovel plows illustrated for the purpose of hilling up the plants left in the row. My device may also be employed as a double shovel cultivator by omitting the scrapers, suitably adjusting the beams and running both plows between the rows drawn by a single horse. It will be understood further that one of the beams carrying the scraper or plow or both, may be disconnected from the other beam and each used separately if desired.

I claim:

The combination, with two beams arranged side by side and adapted to carry scrapers and plows, of adjusting rods at the ends of said beams for varying the distance between them, and an adjustable clevis composed of two bowed resilient strips connected respectively to the front ends of said beams by the front adjusting rod which holds said strips rigidly against lateral turning and whereby said clevis may be adjusted simultaneously with said beams.

In testimony whereof, I affix my signature, in presence of witnesses.

GEO. W. RANDOLPH.

Witnesses:
G. C. HUME,
C. E. BRUNSON,
C. O. KEGG.